United States Patent Office 3,345,166
Patented Oct. 3, 1967

3,345,166

PHOTOGRAPHIC PROCESS WHEREBY A FULLY DEVELOPED AND FIXED NEGATIVE IS FORMED CONCURRENTLY WITH A POSITIVE SILVER TRANSFER IMAGE

Edwin H. Land, Cambridge, Meroe M. Morse, Boston, and Elizabeth L. Yankowski, Watertown, Mass., assignors to Polaroid Corporation, Cambridge, Mass., a corporation of Delaware No Drawing. Filed Mar. 9, 1961, Ser. No. 94,451
3 Claims. (Cl. 96—29)

This invention is related to diffusion transfer photography, and more particularly to forming fully developed and fixed negatives concurrently with the formation of a positive silver transfer image.

The formation of silver transfer images by procedures wherein a sheet containing a photosensitive material is processed while in superposed relationship with a second sheet, the two sheets being wetted by a processing liquid preferably present in a thin layer between the two sheets, is now well known. While the positive silver transfer image exhibits full density when separated from the photosensitive sheet at the end of the imbibition period, examination of the processed photosensitive layer shows that the negative image has been developed only to a relatively low density within this time. The covering power of the silver forming the positive image formed according to these processes may be very high—on the order of five times that of the silver in the negative ("One-Step Photography," Edwin H. Land, The Photographic Journal, Section A, pp. 7–15, January 1950).

It has been noted, e.g., in U.S. Patent No. 2,543,181 issued to Edwin H. Land on Feb. 27, 1951, that the above-described processing procedure could be employed to simply develop the negative image without forming any transfer image, by omitting the substances for forming the soluble silver complex. Alternatively, an already developed negative could be fixed out by these techniques if the silver halide developing agents were omitted and more of the silver complex forming reagent employed.

It has also been noted, e.g., in Example 1 of U.S. Patent No. 2,544,268 issued to Edwin H. Land on Mar. 6, 1951, that these procedures may be employed to form a developed and fixed negative, but without also forming a silver transfer image. In this instance, the silver is dissolved out of the negative and transported into the processing liquid. Although some of the thus diffused silver complex may be reduced to silver in the layer of processing fluid, there is no formation of a positive transfer image.

It has been recognized that, under certain conditions, it might be possible to salvage the silver image which is formed upon development of the exposed silver halide emulsion layer (on a transparent support) and obtain a usable "negative," provided certain additional treatments could be performed without further exposure of the processed negative sheet to actinic light. Thus, it has been proposed that the exposed and processed emulsion be separated from the receiving layer, in the absence of actinic radiation, and in some cases subjected to additional development, followed by fixing in the conventional manner. Such procedures, described for example in the June 1955 issue of Modern Photography, while giving a usable negative, are subject to the serious disadvantage of requiring the negative sheet to be handled in the dark and the ready availability of darkroom facilities.

It also has been proposed, in U.S. Patent No. 2,705,676 issued to Edwin H. Land and Howard G. Rogers on Apr. 5, 1955, to transfer the negative image contained in the separated diffusion transfer photosensitive element to a receiving sheet to form a new negative. The original negative image is not fixed or usable per se, being "a relatively poor negative, i.e., a negative veiled with fog and of low intensity."

It is a principal object of this invention to provide photographic products, processes and compositions whereby a fully developed and fixed negative is formed concurrently with the formation of a positive silver transfer image also of full density.

It is a further object of this invention to provide compositions and processes for removing the processing composition from the developed transfer process negative and for hardening said negative.

Other objects will in part be obvious and will in part appear hereinafter.

The invention accordingly comprises the processes involving the several steps and the relation and order of one or more of such steps with respect to each of the others, and the products and compositions possessing the features, properties and the relation of elements which are exemplified in the following detailed disclosure, and the scope of the application of which will be indicated in the claims.

For a fuller understanding of the nature and objects of the invention, reference should be had to the following detailed description.

In the processes of this invention, a photosensitive silver halide emulsion, carried on a transparent support, is developed with an aqueous alkaline processing fluid while in superposed relationship with an image-carrying sheet. The processing fluid includes a silver halide solvent which is capable of forming a water-soluble complex with unexposed and undeveloped silver halide. The resulting silver complex is transferred, by diffusion, to a superposed image-receiving layer containing silver precipitating agents. The silver of the transferred silver complex is there precipitated to form the silver transfer image. After a predetermined imbibition period, e.g., from about 10 to 120 seconds, the image-receiving layer containing the silver transfer image is separated from the silver halide emulsion layer.

Previous to this invention, as noted above, the negative image obtained in such silver transfer processes either was unusable or usable only with some difficulty.

It has now been found that a fully developed and fixed out, high quality negative may be formed concurrently with the formation of a high quality transfer image. This is accomplished by developing a silver halide emulsion, preferably a fine grain silver iodobromide emulsion, in superposed relationship with an image-receiving layer, under processing conditions such that all of the silver halide is either developed in the negative layer or transferred out of the negative layer, and the silver of the negative and positive images is deposited in a form having relatively high covering power, so that each image has a maximum density in excess of 1.0 (negative density being read by transmission). The resulting negative image is insensitive to further exposure to actinic light and may be handled in the light immediately upon removal from the camera. In a preferred embodiment, the negative and positive are completed within 10 to 15 seconds, but imbibition may be continued for at least a minute or longer without significantly changing the curve characteristics of the negative and positive images. In addition, the processes of this invention may be performed over a wide range of temperatures, e.g., 55 to 95° F., without requiring changes in imbibition times and still give the very high quality negative and positive images. This negative may be used to print images as soon as the layer of processing fluid which adheres to the negative surface has been removed. The antihalation coating preferably also is removed prior to printing in order to shorten the printing time.

In accordance with this invention, a relatively thin silver halide emulsion layer is developed with an aqueous alkaline processing fluid containing at least two times, and preferably at least about four times, the quantity of silver halide solvent, preferably sodium thiosulfate, necessary to obtain only a silver transfer image of comparable density and quality in one minute. This amount of sodium thiosulfate also is in excess, by weight, of the amount of the sodium hydroxide.

The following examples are given for purposes of illustration only, and are not intended to be limiting.

*Example 1*

A sheet of commercially available Kodak Panatomic-X (a fine grain, silver iodobromide emulsion) was exposed and then developed, while in superposed relationship with an image-receiving sheet like that used in Type 53, 4 x 5 Polaroid Land Film Packet, with a processing fluid comprising:

| | | |
|---|---|---|
| Water | cc | 8100 |
| Sodium carboxymethyl cellulose (high viscosity) | grams | 308.8 |
| Sodium sulfite | do | 518.4 |
| Sodium hydroxide | do | 307.8 |
| Sodium thiosulfate | do | 109.4 |
| 5-nitrobenzimidazole (4% solution) | cc | 101 |
| Hydroquinone | grams | 324 |
| Metol | do | 10.1 |

to which 1 g. of sodium thiosulfate was added per 10 cc. of said processing fluid. After an imbibition period of approximately 1 minute, the negative and positive were separated. The negative was washed under running water to remove the adhered layer of processing fluid and the negative dried. Positive images obtained by this procedure were found to have a maximum density of 1.5–1.6, and a minimum density of 0.01–0.02. The corresponding negatives, which were not subjected to any development or fixing treatment after imibibition, were found to have a maximum density of 1.3–1.4 and a minimum density of 0.15–0.18. By comparison, a similarly exposed negative developed in Kodak Dektol (diluted 1:1) for 3 minutes, with agitation every 15 seconds, was found to have a maximum density of 1.29.

*Example 2*

The procedure described in Example 1 was repeated using a thinner emulsion layer, approximately 0.0002" thick, of a fine grain, silver iodobromide emulsion substantially similar to Kodak Panatomic-X, and a processing fluid comprising:

| | | |
|---|---|---|
| Water | cc | 180 |
| Sodium carboxymethyl cellulose (high viscosity) | grams | 6 |
| Sodium hydroxide | do | 9 |
| Sodium thiosulfate | do | 10.8 |
| Amidol | do | 7.2 |
| Ascorbic acid | do | 1.8 |
| Sodium sulfite | do | 6.5 |

After an imbibition period of approximately 10 seconds, the negative and positive were separated. After washing and removal of the residual layer of processing fluid and the antihalation coating, the negative had a maximum density of 1.53 and a minimum density of 0.47. The positive image had a maximum density of 1.57 and a minimum density of 0.2.

*Example 3*

The procedure of Example 1 was repeated, with a 1 minute imbibition period, using a processing fluid having the following composition:

| | | |
|---|---|---|
| Water | cc | 8120 |
| Sodium carboxymethyl cellulose (high viscosity) | grams | 300 |
| Sodium carboxymethyl cellulose (medium viscosity) | do | 100 |
| Sodium sulfite | do | 512 |
| Sodium hydroxide | do | 434 |
| Sodium thiosulfate | do | 676 |
| 5-nitrobenzimidazole (4% solution) | cc | 450 |
| 2-methyl - 4 - amino-6-methoxy-phenol hydrochloride | grams | 90 |
| Toluhydroquinone | do | 360 |

As examples of other silver halide developing agents which are particularly useful in the processes of this invention, and particularly with imbibition periods of 10 to 20 seconds, mention may be made of 2,6-dimethyl hydroquinone, 2,5-dimethyl hydroquinone, phenyl hydroquinone, 4'-methylphenyl hydroquinone, and tertiary butyl hydroquinone.

It has been found that the layer of processing fluid may be allowed to remain on the unwashed negative for extended periods of time without deleterious effect on the negative. Should the developing agent be one whose oxidation product is strongly colored, e.g., amidol, it is preferred to wash the residual processing fluid from the negative as soon as convenient to avoid staining of the negative. With many developing agents, e.g., toluhydroquinone, it has been found that a delay in washing of the negative as long as 8 to 24 hours or longer was possible without obtaining negative stain from the residual processing fluid. The mask preferably is removed as soon as convenient, to avoid having it adhere to the emulsion layer.

The developed emulsion layer is relatively soft and should be handled with care to avoid scratching. In a preferred embodiment, the separated negative is treated with a conventional hardening agent. This hardening treatment may be combined with the bleaching of the antihalation layer by reagents commonly used for this purpose. In a preferred embodiment, the negative, with the adhered layer of processing fluid, is treated with such a hardening solution prior to washing in water. Preferred hardening agents are chrome alum and potassium alum.

It has been discovered that if the hardening solution contains alum, the adhered layer of processing fluid maintains a physical cohesion and "slides" off the emulsion layer in a thin film. In the absence of the alum, the layer of processing fluid separates into small jelly-like masses which are relatively difficult to remove without danger of scratching the negative.

A suitable hardening and bleaching solution of this type comprises:

| | | |
|---|---|---|
| Sodium bisulfite | grams | 10–20 |
| Potassium alum | do | 1–2 |
| Water | cc | 100 |

It will be noted that many commercially available combined fixer-hardener solutions are useful in this manner, if the hypo is omitted. A particularly useful hardening and bleaching solution is that described as Formula F-1*a* (Acid Hardener Stock Solution) in Photographic Chemicals and Solutions, J. I. Crabtree and G. E. Matthews, published by American Photographic Publishing Company, Boston, Mass. 1938, p. 309, and diluted 1:1 with water.

The negatives obtained in the process of this invention are of very high quality and of very fine grain and give extremely high quality enlargements. Thus, for example, a portion of a negative approximately 1⅞ x 2½" enlarged to 20 x 24" gave a very sharp, relatively grainless enlargement. Negatives obtained according to this process may be printed in the customary manner, using any type of printing light, and generally give good results using "normal" or No. 2 printing paper. "Hard" printing papers may be used if desired, but good results are generally obtained using No. 2 or No. 3 paper with a cold light type enlarger.

Examination of a negative processed as in Example 1 without the addition of the added sodium thiosulfate showed that the negative was not fixed out and that it contains an appreciable brown strain.

It is believed that the concurrent formation of the high quality positive image and fully developed and fixed negative image is due, at least in part, to a change in the process equilibria as a result of the unusually high concentration of the silver halide solvent. It is known that the quantity of sodium thiosulfate normally used in the formation of only a positive silver transfer image, e.g., in one minute, is used in a cyclic manner, being recycled after regeneration upon precipitation of the silver from the complex. The large quantity of sodium thiosulfate used in the processes of this invention is believed to shift the process equilibria in such a manner, particularly in combination with a fine grain, readily dissolvable silver iodobromide emulsion, that the silver formed in both the negative and positive layers has similar and very high covering power. This in turn facilitates the use of substantially all the silver halide in forming either the negative or positive images.

It is belived that the exceptional high covering power of the silver forming the negative image is due to the silver being dissolved and reprecipitating upon developed fine grains which serve as silver precipitation nuclei in the negative.

Negatives obained by the processes of this invention, using a silver halide emulsion similar to Eastman Kodak Panatomic-X, have a resolution in excess of 150 lines per mm., while the corresponding positive images have a resolution in excess of 25 lines per mm. These negative and positive images exhibit substantially the same film speed, generally within the range A.S.A. 64 to 125.

A very surprising discovery has been that the negative obtained by the process of this invention has a density in most cases appreciably higher than the density obtained by conventional wet development of the same emulsion coating, and, furthermore, the slope of its characteristic curve is higher than that obtained by such wet development.

It also was found that high quality usable negatives may be obtained in accordance with this invention even where the positive transfer image exhibited the characteristics of a stop overexposure. Where imbibition is effected within the range 55 to 95° F., correct exposure for the positive image also will give a correctly exposed negative.

As noted above, this invention provides a finished transfer image and a negative which is fully developed and fixed at the time it is separated from the image-receiving layer. Since the separated negative is insensitive to light and need not be washed or otherwise treated immediately, it may be rolled up after being separated from the image-receiving layer. Suitable camera structures for rolling up a processed negative are described in U.S. Patent No. 2,443,154 issued to Otto E. Wolff on June 8, 1948, and U.S. Patent No. 2,458,186 issued to Rosario J. Messina and Otto E. Wolff on January 4, 1949. Suitable provision, e.g., a plastic interliner, should be taken to insure that the rolled up negative may be readily unrolled without damage. Suitable camera structure for effecting this is described in the copending application of Nichols Gold and Arthur J. Sable, Serial No. 74,341, filed December 7, 1960, now U.S. Patent No. 3,134,313 issued May 26, 1964. Photographic films incorporating the process of this invention thus are particularly suited for continuous process applications where a permanent negative is desired for a future reference, and a positive image is required for immediate examination and/or use. One particular application which might be noted is the taking of identification pictures, e.g., where a person applying for a driver's license or security pass is photographed on the same frame with the completed application form or other papers. The resulting positive transfer image may be used as a proof, and the negative used as a file copy and to make the desired prints. Another application of this process is in the continuous processing of fine grain, motion picture negatives to obtain an immediately projectable positive print as well as a negative for future use.

As noted above, the silver halide emulsion is preferably a fine grain, readily dissolvable, silver iodobromide emulsion having panchromatic sensitivity. Emulsions having a grain size of about 1 to 2$\mu$ have been found to be particularly useful. While an emulsion of the type employed in Eastman Kodak Panatomic-X film has been particularly useful, it is contemplated that other emulsions having similar characteristics also may be used, e.g., Eastman Kodak Background X.

The processes of this invention are useful in films intended for use in cameras employing roll film, sheet film (see, e.g., U.S. Patent No. 2,854,908 issued to Vaito K. Eloranta on Oct. 7, 1958) and film pack type photosensitive materials.

Numerous silver precipitating agents useful in the process of this invention are known in the art. As examples of suitable silver precipitating agents, and of image-receiving elements containing such silver precipitating agents, reference may be made to U.S. Patents Nos. 2,698,237, 2,698,238 and 2,698,245 issued to Edwin H. Land on December 28, 1954, U.S. Patent No. 2,774,667 issued to Edwin H. Land and Meroe M. Morse on December 18, 1956, and also U.S. Patent No. 2,823,122 issued to Edwin H. Land on February 11, 1958.

The image-receiving layer may be coated on a transparent or opaque support, thereby giving either a positive transparency or a reflection print.

Development also may be effected employing volatile silver halide developing agents, such as N,N-diethyl hydroxylamine, as disclosed in U.S. Patent No. 2,857,276 issued to Edwin H. Land, Saul G. Cohen and Helen J. Tracy on October 21, 1958.

Viscosity-increasing, film-forming reagents other than sodium carboxymethyl cellulose, e.g., hydroxyethyl cellulose, also may be used.

Since certain changes may be made in the above products, compositions and processes without departing from the scope of the invention herein involved, it is intended that all matter contained in the above description shall be interpreted as illustrative and not in a limiting sense.

What is claimed is:

1. A process of forming a fully developed and fixed out negative concurrently with the formation of a silver transfer image comprising developing an exposed silver halide emulsion layer, said emulsion being a silver iodobromide emulsion the grains of which have an average diameter of approximately 1 to 2$\mu$, with a processing fluid including an alkali, a silver halide developing agent, a viscosity-increasing, film-forming reagent, said film-forming reagent being selected from the group consisting of sodium carboxymethyl cellulose and hydroxyethyl cellulose, and a silver halide solvent capable of forming water-soluble complexes with unexposed and undeveloped silver hailde, said silver halide solvent being present in a concentration, by weight, in excess of the concentration of said alkali, said silver halide solvent being present in a concentration approximately at least 4 times that concentration necessary to obtain a silver transfer image having a maximum density in excess of 1.0 in 1 minute with the same silver halide emulsion layer, forming an imagewise distribution of said soluble silver complex in undeveloped areas, transferring said soluble silver complex to a superposed image-receiving layer to form a positive silver transfer image and separating said image-receiving layer and said silver halide emulsion layer, said separated silver halide emulsion layer being insensitive to further actinic radiation and containing a fully developed and fixed out negative image, the silver of said negative and positive images having high covering power and said negative the positive images each having a maximum density in excess of 1.0.

2. A process as defined in claim 1, wherein said separated silver halide emulsion layer has adhered to the surface thereof, a layer of said processing fluid, and said silver halide emulsion layer is treated with a hardening solution containing an alum and a sulfite, said hardening solution being effective also to remove said processing fluid and any antihalation layer, thereby removing said processing fluid without scratching said negative.

3. A process for forming a fully developed and fixed out negative image concurrently with the formation of a positive silver transfer image, comprising exposing a layer of a silver halide emulsion, said silver halide emulsion being a fine grain silver iodobromide emulsion the grains of which have an average diameter of approximately 1 to 2$\mu$, developing said exposed silver halide emulsion layer with a processing fluid including sodium carboxymethyl cellulose, a silver halide developing agent, sodium hydroxide and sodium thiosulfate, forming an imagewise distribution of a soluble silver complex by reacting said sodium thiosulfate with undeveloped and unreduced silver halide in undeveloped areas, transferring said soluble silver complex by diffusion to a superposed image-receiving layer containing silver precipitants to form a positive silver transfer image, and separating said image-receiving layer from said silver halide emulsion layer, said sodium thiosulfate being present in a concentration by weight in excess of the concentration of said sodium hydroxide, said sodium thiosulfate further being present in a concentration approximately at least four times that concentration necessary to obtain only a silver transfer image having a maximum density in excess of 1.0 in one minute from said exposed silver halide emulsion layer, whereby said separated silver halide emulsion layer is insensitive to further actinic radiation and contains a fully developed and fixed out negative image, the silver of said negative and positive images having a high covering power and said negative and positive images each having a maximum density in excess of 1.0.

References Cited

UNITED STATES PATENTS

| | | | |
|---|---|---|---|
| 2,500,421 | 3/1950 | Land | 96—29 |
| 2,534,050 | 12/1950 | Murray | 96—111 |
| 2,543,181 | 2/1951 | Land | 96—29 |
| 2,544,268 | 3/1951 | Land | 96—29 |
| 2,647,056 | 7/1953 | Land | 96—29 |
| 2,686,716 | 8/1954 | Land | 96—29 |
| 2,751,300 | 6/1956 | James et al. | 96—29 |
| 2,759,825 | 8/1956 | Land | 96—29 |
| 2,774,667 | 12/1956 | Land et al. | 96—29 |
| 2,962,377 | 11/1960 | Land | 96—29 |
| 2,982,650 | 2/1961 | Land | 96—29 |
| 3,120,795 | 2/1964 | Land | 95—90 |

FOREIGN PATENTS 706,333 3/1954 Great Britain.

OTHER REFERENCES

Glafkides, Photographic Chemistry, Fountain Press, London (1958), p. 470.

Hornung, British Journal of Photography, Nov. 19, 1954, pp. 593–594.

Land, Journal of the Optical Society of America, 37, 61–77, February 1947.

Land, The Photographic Journal, Section A, 7–15, January 1950.

Mees, The Theory of the Photographic Process, 2nd edition, Macmillan, New York (1954), pp. 710–724.

Newman, British Journal of Photography, Jan. 23 and Jan. 30, 1959, pp. 44–48, 56, 66–68.

PHILIP E. MANGAN, *Primary Examiner.*

NORMAN G. TORCHIN, *Examiner.*

G. H. BJORGE, C. E. VANHORN, *Assistant Examiners.*

UNITED STATES PATENT OFFICE
CERTIFICATE OF CORRECTION

Patent No. 3,345,166 October 3, 1967

Edwin H. Land et al.

It is hereby certified that error appears in the above numbered patent requiring correction and that the said Letters Patent should read as corrected below.

Column 6, line 73, for "the" read -- and --.

Signed and sealed this 18th day of February 1969.

(SEAL)
Attest:

Edward M. Fletcher, Jr.
Attesting Officer

EDWARD J. BRENNER
Commissioner of Patents